Figure 1:
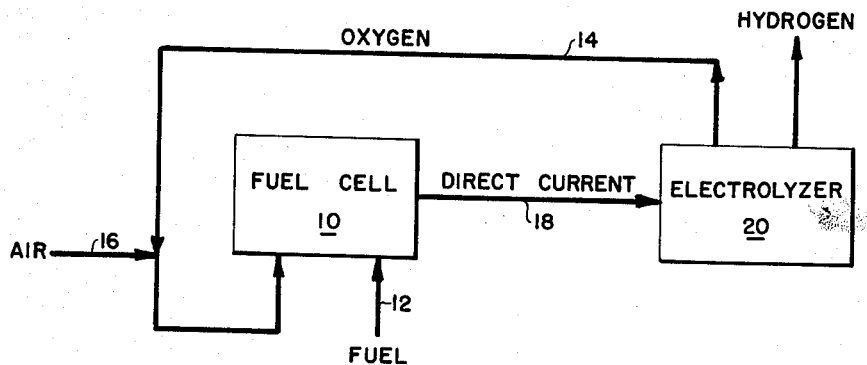

INVENTORS
EDWARD J. WASP
PAUL A. C. COOK
BY
THEIR ATTORNEY

United States Patent Office 3,180,813
Patented Apr. 27, 1965

3,180,813
ELECTROLYTIC PROCESS FOR PRODUCING HYDROGEN FROM HYDROCARBONACEOUS GASES
Edward J. Wasp and Paul A. C. Cook, Pittsburgh, Pa., assignors to Consolidation Coal Company, Pittsburgh, Pa., a corporation of Pennsylvania
Filed May 31, 1961, Ser. No. 113,752
2 Claims. (Cl. 204—129)

The present invention relates to a process for the production of hydrogen, especially high purity hydrogen.

Hydrogen is generally produced from methane-containing gases such as natural gas by a conventional type steam-reforming process or a partial oxidation process. In addition to the hydrogen contained in the product gases obtained from the above processes, the product gases also contain substantial amounts of carbon dioxide, carbon monoxide, and unreacted feed gas, for example, methane. In a great many commercial processes which use hydrogen, it is necessary that the hydrogen be essentially pure hydrogen. Consequently, before the hydrogen-rich product gas obtained from the above processes can be used commercially, the gaseous impurities, i.e., oxides of carbon and unreacted feed gas, must be removed. Frequently, the cost associated with increasing the hydrogen purity of the hydrogen-rich product gas comprises a major part of the over-all economics.

As a result of our research we have now developed a novel process for producing hydrogen which is essentially 100 percent pure without the need for subsequent purification steps as is required in the steam-reforming and partial oxidation processes.

One object of this invention is to provide a novel process for the production of hydrogen.

Another object of this invention is to provide a novel process for supplying electrical energy to an electrolyzer wherein high purity hydrogen is produced.

A further object of this invention is to provide a process for the production of hydrogen, which process is especially adaptable for supplying the hydrogen required in the conversion of hydrocarbonaceous materials to more valuable hydrocarobnaceous products.

In accordance with our invention, an electrochemical cell is combined with an electrolyzer to produce high purity hydrogen. Electrical energy is produced in the conventional type electrochemical cell, hereinafter referred to as a fuel cell, by the electrochemical combustion of a fuel, preferably a fuel gas, with an oxidizing gas such as an oxygen-containing gas. At least a portion of the electrical energy which is produced in the fuel cell is supplied to a conventional type electrolyzer. The electrolyzer contains an electrolyte which upon dissociation yields hydrogen and an oxidizing gas. At least a portion of the oxidizing gas is subsequently introduced into the fuel cell. Hydrogen in a highly purified state is separately recovered from the electrolyzer.

In the preferred embodiment of our invention the fuel cell and the electrolyzer are integrated within a process for the conversion of coal to more valuable hydrocarbonaceous products. The fuel used in the fuel cell consists of the off-gases which are recovered from the various process steps throughout the coal conversion plant. Off-gases are generally defined as the non-condensable gases that are produced as an undesirable by-product of a particular unit process step. In a conventional hydrocarbon conversion plant such as a coal conversion plant, the so-called "off-gases" generally comprise in varying proportions a number of the following materials: hydrogen, carbon dioxide, carbon monoxide, and the $C_1$ to $C_5$ hydrocarbons. These gases are particularly well suited for use as the fuel in a fuel cell.

Figure 2:
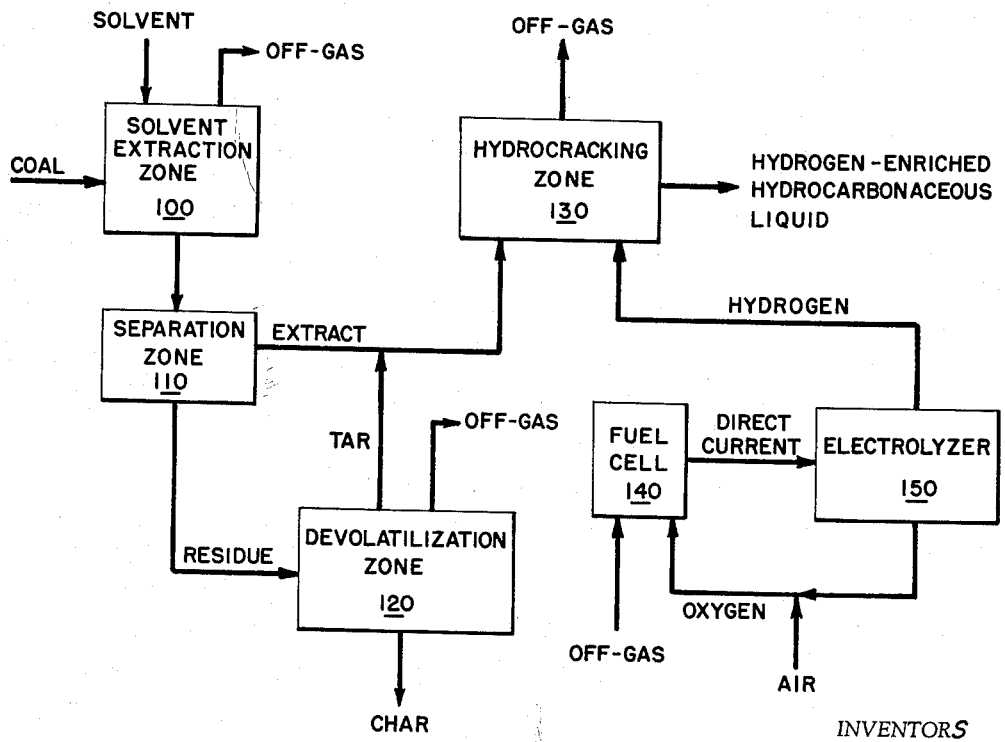

For a more complete understanding of our invention, its objects and advantages, reference should be had to the following description and to the accompanying drawings in which:

FIGURE 1 is an illustration of the method of producing hydrogen in accordance with this invention; and FIGURE 2 is an illustration of the preferred embodiment of this invention.

Referring to FIGURE 1, a simplified illustration of the method of producing hydrogen in this invention is shown. In brief, the scheme of FIGURE 1 comprises the conversion of fuel, preferably fuel gas, in a fuel cell 10 with an oxidizing gas to produce electrical energy. The electrical energy is conveyed to an electrolyzer 20 wherein oxidizing gas and hydrogen are produced.

Fuel gas, such as hydrogen, methane, natural gas or carbon monoxide, is introduced into a conventional type fuel cell 10 via a conduit 12. The fuel cell 10 may be any of the electrochemical cells employed by those skilled in the art, the conditions of operation, the electrolyte, and the particular fuel being determined primarily by the fuel cell which is used. The precise construction and operation of the fuel cell forms no part of this invention. Such cells have been fully described in the literature, "Gas Cell With Solid Electrolyte," Bull. Acad. Sci. USSR, Classe Sci. Tech., 215–218 (1946); Zeit. für Electrochemie 27, 199–208; ibid. 44, 727–32 (1957); U.S. Patent 2,384,463 (1945); U.S. Patent 2,901,524 (1959).

The oxidizing gas used in the fuel cell 10 is introduced via a conduit 14. In this invention one primary source of the oxidizing gas is the electrolyzer; however, because sufficient oxidizing gas is not produced therein, additional oxygen-containing gas such as air is introduced into the fuel cell via a conduit 16. As a result of the electrochemical combustion of the fuel, electrical energy is produced. The electrical energy is schematically shown as being conducted via a conduit 18 from the fuel cell 10 to an electrolyzer 20. As in the case of the fuel cell, the mode of construction of the electrolyzer forms no part of this invention.

The electrolyte which is employed in the eletcrolyzer 20 must be one that, upon dissociation by the electric current, will produce hydrogen and an oxidizing gas, preferably oxygen. The most commonly used electrolyte which meets the above requirements is water. Because of the low electrical conductivity of pure water, however, solutions of potassium or sodium hydroxide in distilled water are generally used as the electrolyte in most electrolyzers.

Preferably, the electrolyzer is of the high pressure type so that the hydrogen which is produced therein may be directly employed in conventional type hydrocarbon conversion operations, examples of which are hydrogenation, hydrocracking, hydroforming, and hydrofining. The hydrogen which is recovered from the electrolyzer is essentially pure hydrogen and requires no purification. The purity of the hydrogen, in combination with being able to produce the hydrogen at different pressures, is particularly advantageous. The oxygen which is produced in the electrolyzer 20 is introduced via the conduit 14 into the fuel cell 10.

A corollary advantage results from the above combination of the fuel cell and the electrolyzer in that the fuel cell produces direct current and the electrolyzer uses direct current.

Generally, all of the fuel gas is combusted in the fuel cell to produce electrical energy. However, if the fuel gas is a hydrocarbon gas such as methane, it is within the scope of this invention to combust only a portion of the methane to produce electricity and then convert the remaining methane to hydrogen via a conventional steam-reforming reaction. For example, conventional steam-reforming catalyst such as nickel may be incorporated in the fuel gas channels or, alternatively, the fuel cell may be immersed in a fluidized bed of steam-reforming catalyst such as described in U.S. Patent No. 2,570,543. The heat produced from the partial combustion of the methane is sufficient to maintain the steam-reforming reaction. Thus the uncombusted portion of the methane reacts with steam in the presence of the reforming catalyst to yield hydrogen and the oxides of carbon. The effluent gas is recovered from the fuel cell and the hydrogen is subsequently, separately recovered from the gas.

It is necessary that a portion of the effluent gas be recycled to the fuel cell in order to provide the steam for the steam-reforming reaction. The steam is produced by the partial combustion of the methane. The ratio of recycle gas to fresh methane introduced into the fuel cell is generally in the range of about 1 to 1.5 moles.

As in the case when the fuel gas is completely combusted, the electricity produced via partial combustion is similarly utilized to produce hydrogen via electrolysis. Thus by partial combustion, hydrogen is recovered from both the electrolyzer and the fuel cell. This method of operation, that is, partial combustion of the fuel gas, makes it possible to produce hydrogen with an efficiency of up to about 85 percent.

Preferred embodiment

The following, with reference to FIGURE 2, is a description of the preferred embodiment of this invention. As schematically shown in FIGURE 2, coal, preferably high volatile bituminous coal, is subjected to solvent extraction in a solvent extraction zone 100 to produce a mixture of extract and undissolved coal, the undissolved coal being referred to as residue. The extract and residue are separated in a separation zone 110, e.g., a filtration zone, and the residue is then introduced into a devolatilization zone 120. Distillate tar and a hydrocarbonaceous solid, referred to as char, are produced in the devolatilization zone 120 (which is preferably a fluidized low temperature carbonization zone). Portions of the distillate tar and the extract are subsequently combined and then introduced into a catalytic hydrocracking zone 130 wherein valuable hydrogen-enriched hydrocarbonaceous liquid products are produced. The operation of the above zones and the conditions maintained therein are fully described in copending U.S. patent application Serial No. 61,518, filed by Everett Gorin October 10, 1960, now U.S. Patent 3,018,242, and assigned to the assignee of this invention.

Off-gases are produced as an undesirable by-product throughout the above coal conversion process. In most coal conversion processes it is economically essential that the production of these off-gases be maintained as low as possible. Inevitably, however, a substantial amount of off-gases is produced. The majority of the off-gases are produced in the solvent extraction zone, devolatilization zone, and the hydrocracking zone. These off-gases are particularly suitable for employment as the fuel gas in a fuel cell. Moreover, since a considerable amount of high purity hydrogen is required in the conversion of the coal, the integration of the fuel cell and electrolyzer is uniquely applicable to the aforementioned coal conversion scheme.

Referring to FIGURE 2, it can be seen that off-gases are produced in extraction zone 100, devolatilization zone 120, and hydrocracking zone 130. These off-gases, which as previously mentioned generally comprise hydrogen, carbon dioxide, carbon monoxide, and $C_1$ to $C_5$ hydrocarbons, are conveniently combined and introduced by any suitable means into a fuel cell 140. The operation of the fuel cell 140 and an electrolyzer 150 is similar to that previously discussed in terms of FIGURE 1.

The hydrogen produced by the electrolyzer 150 is conveyed by suitable means and utilized in the hydrocracking zone 130. Obviously, the hydrogen may be employed as desired throughout the coal conversion process. A portion of the hydrogen may also be employed in the refining of the hydrogen-enriched hydrocarbonaceous liquid. The electrolyzer 150 is preferably a high pressure type electrolyzer so that the hydrogen may be directly introduced into the hydrocracking zone 130 which generally operates at about 1000 to 5000 p.s.i.g.

Example

The following example is an illustration of the use of the process described in the preferred embodiment of this invention. Pittsburgh seam coal is treated in a solvent extraction zone with a solvent recovered from a previous hydrogenation of extract under the following conditions:

Process conditions:
- Temperature _____ ° C__ 380
- Pressure _____ p.s.i.g__ 70
- Solvent/coal ratio _____ 1.0
- Residence time _____ hour__ 1.0

The solvent comprises a mixture of a 260° to 325° C. hydrocarbonaceous liquid fraction and a 325° to 425° C. hydrocarbonaceous liquid fraction in the ratio by weight of 1 to 1 respectively. The yields of the extraction treatment are:

Yields: Original coal, wt. percent moisture-free and ash-free (MAF) basis
- Extract _____ 57.8
- Gases+water _____ 7.3
- Residue _____ 34.9

The extract is separated from the residue by filtration and the extract is then introduced into a topping still. The residue is carbonized in a fluidized low temperature carbonization zone under the following conditions and giving the following yields:

Process conditions:
- Temperature _____ ° C__ 510
- Residence time _____ minutes__ 20
- Sweep gas rate _____ cu. ft./lb__ 4

Yields: Wt. percent MAF residue
- Gas+$C_4$ _____ 2.8
- Liquor _____ 2.8
- Tar+light oil _____ 16.4
- Char _____ 78.0

100.0

The portion of the extract and the tar plus light oil boiling above 325° C. is introduced in admixture with a catalyst into a liquid phase catalytic hydrogenation zone under the following conditions with the following yields:

Process conditions:
- Temperature _____ ° C__ 441
- Pressure _____ p.s.i.g__ 3500
- Residence time (on fresh feed) ____ hours__ 2.8
- Catalyst _____ $MoS_2$ Yields: Wt. percent fresh feed
- $C_1$-$C_3$ _____ 12.5
- $C_4$ _____ 5.2
- $C_5$—325° C. distillate _____ 80.6

The gas plus $C_1$ to $C_4$ hydrocarbons from the above solvent extraction zone, carbonization retort, and hydrogenation zone are introduced into a fused carbonate high temperature type cell under the following conditions to produce direct current.

Operating conditions of fuel
- Cell _____ 19.5 p.s.i.a., 1488° F.
- Power density of fuel cell at internal resistance of $3.5 \times 10^{-3}$ ohms/ft.$^2$ _____ 0.91 volt/unit cell. 18 watts/ft.$^2$.

The electric current from the fuel cell is supplied to a high pressure electrolyzer wherein water is converted to hydrogen and oxygen.

Operating conditions high pressure
electrolysis _____ 300 p.s.i.a., 40° C., 1.8 volts / unit cell.
Moles hydrogen produced by electrolysis/mole methane burned in fuel cell _____ 2.02.
Heating value of hydrogen produced (percent of methane burned)_____ 64.8.
Percentage of oxygen requirements for fuel cell produced by electrolysis _____ 50.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. A process for the production of high purity hydrogen from water and a hydrocarbonaceous gas which comprises, in combination, the following steps,
  (a) converting said hydrocarbonaceous gas to electrical energy by electrochemically combusting said gas with an oxidizing gas in an electrochemical cell,
  (b) introducing water and at least a portion of said electrical energy from said electrochemical cell into an electrolyzer containing an aqueous electrolyte,
  (c) effecting dissociation of said water in said electrolyzer to yield hydrogen and oxygen,
  (d) conducting at least a portion of the oxygen produced in the electrolyzer to said electrochemical cell to serve at least as part of the oxidizing gas in said cell, and
  (e) separately recovering high purity hydrogen from said electrolyzer.
2. A process for the production of high purity hydrogen from water and a fuel gas containing $C_1$ to $C_5$ hydrocarbons which comprises, in combination, the following steps,
  (a) converting said fuel gas to electrical energy by electrochemically combusting said gas with an oxidizing gas in an electrochemical cell,
  (b) introducing water and a least a portion of said electrical energy from said electrochemical cell into an electrolyzer containing an aqueous electrolyte,
  (c) effecting dissociation of said water in said electrolyzer to yield hydrogen and oxygen,
  (d) conducting at least a portion of the oxygen produced in the electrolyzer to said electrochemical cell to serve at least as part of the oxidizing gas in said cell, and
  (e) separately recovering high purity hydrogen from said electrolyzer.

References Cited by the Examiner
UNITED STATES PATENTS

| | | | |
|---|---|---|---|
| 2,384,463 | 9/45 | Gunn et al. | 204—129 |
| 2,756,194 | 7/56 | Mayland | 208—10 |
| 3,018,242 | 1/62 | Gorin | 208—10 |
| 3,124,520 | 3/64 | Juda. | |

FOREIGN PATENTS

| | | |
|---|---|---|
| 1,051,820 | 11/55 | Germany. |
| 5,030 of 1879 | 12/79 | Great Britain. |
| 6,417 of 1887 | 5/88 | Great Britain. |

OTHER REFERENCES

Mantell: Electrochemical Engineering, 4th ed. (1960), pages 308–20.

JOHN H. MACK, *Primary Examiner.*

JOHN R. SPECK, MURRAY TILLMAN, *Examiners.*